United States Patent [19]

Kline

[11] 4,309,818

[45] Jan. 12, 1982

[54] METHOD FOR MANUFACTURING A PREFORMED FLEX-RIB BATTERY CASE

[75] Inventor: Richard H. Kline, Anderson, Ind.

[73] Assignee: General Motors Corporation, Detroit, Mich.

[21] Appl. No.: 153,334

[22] Filed: May 27, 1980

[51] Int. Cl.³ .............................................. H01M 2/02
[52] U.S. Cl. .................................. 29/623.1; 264/339; 264/295; 225/103; 429/176
[58] Field of Search ...................... 29/623.1, 731, 730; 264/296, 295, 339; 225/103; 429/176, 186, 163

[56] References Cited

U.S. PATENT DOCUMENTS

| | | | |
|---|---|---|---|
| 2,959,819 | 11/1960 | Potter | 264/339 |
| 3,607,440 | 9/1971 | Daniel | 429/176 |
| 4,041,603 | 8/1977 | Thune | 29/623.1 |
| 4,158,692 | 6/1979 | Nilsson | 264/296 |

Primary Examiner—Daniel C. Crane
Attorney, Agent, or Firm—Lawrence B. Plant

[57] ABSTRACT

A battery container, the walls of which, include integrally molded, resilient ribs extending at acute angles from the walls to retain the battery's electrochemical innards firmly in the container. Each as-molded rib is plastically deformed and reshaped so that a lead-in portion thereof near the container opening is at a lesser angle with respect to the wall than the undeformed portion of the rib which serves to resiliently retain the innards. The section of rib between the lead-in portion and retaining portion extends at various angles intermediate the other angles and provide an incline or ramp for facilitating insertion of the battery's innards into the container. The tooling used to plastically deform the lead-in portion of the rib may also include means for tearing the bottom of the rib away from the bottom of the container.

4 Claims, 13 Drawing Figures

METHOD FOR MANUFACTURING A PREFORMED FLEX-RIB BATTERY CASE

BACKGROUND OF THE INVENTION

This invention relates to battery containers the walls of which include resilient ribs integrally molded therewith and which project at acute angles into the cell compartment(s) to firmly engage and retain the battery's electrochemical innards in the container regardless of the thickness of the innards.

Automobile lead-acid storage batteries have standardized outside dimensions in different size categories. Battery manufacturers typically provide batteries with varying energy capacities in each size category. This is done by varying the number of positive and negative plates in each cell element which comprises the battery's electrochemical innards. Varying the number of plates in turn varies the thickness of the cell element that must be positioned and firmly retained in the containers' cell compartment(s). Traditionally, the lower energy batteries contain about nine plates per cell element while the higher energy batteries can contain as high as sixteen plates per element and these elements vary in thickness from about 2.42 cm to about 4.24 cm, respectively. Each cell element is spaced from the walls of the cell compartment and firmly held substantially centrally therein by ribs integrally molded normal to the walls defining the compartment. Larger ribs (i.e., in greater relief from the wall) are used for the thin cell element and conversely smaller ribs for the thicker cell elements.

To provide a variety of battery models, many battery manufacturers have had to inventory at least one case mold for each battery model it sells and has had to shut down its production line to change over from one model to the next. Other manufacturers inventory a lesser number of molds and incorporate inert spacers (e.g., extra separators) in each cell element to add thickness to cell elements having a fewer number of plates. This approach, however, adds the extra cost of the spacer and frequently complicates the in-plant handling of the cell element particularly during its insertion into the container.

At least one manufacturer molds oversized ribs in a few standardized containers and then cuts the ribs back to the desired size depending on the thickness of the cell element destined for the particular container. This technique is disclosed in Thune U.S. Pat. No. 4,041,603 issued Aug. 16, 1977 and assigned to the assignee of the present invention. This approach requires a separate trimming operation and tools therefor.

Still other manufacturers have proposed molding resilient ribs at angles to the container walls which ribs deflect by an amount commensurate with the thickness of the cell element inserted in the cell compartment. The resilient ribs are said to improve the vibration resistance of the batteries having the thicker cell elements. Containers having resilient ribs angling from the walls offer considerable resistance to the insertion of the cell elements during the "casing out" step of the assembly operation. Moreover, forcing the elements into the cell container against the action of the ribs often causes the ribs to tear separators enveloping the end plates or otherwise deleteriously affect the cell element. Resistance to insertion becomes even more acute as the cell element approaches the bottom of the cell container where the base of the rib is attached to the bottom of the container. With the base of the rib attached to the bottom of the container, the lower, or element retaining, portion of the rib is less free to flex than portions of the rib more remote from the base hence creating greater insertion resistance as the cell element is inserted deeper and deeper into the container during "case-out".

It is an object of the present invention to provide a battery container having integrally molded resilient ribs for retaining the battery's electrochemical innards which ribs are so shaped as to facilitate insertion of the cell innards into the container without deleteriously affecting the innards. It is a further object of the present invention to provide a process and means for reshaping as-molded, angling, resilient battery-container ribs to provide ribs having less resistance to cell element insertion and less tendency to damage a cell element during insertion. It is a still further object of the present invention to provide a process and means for reshaping as-molded resilient battery container ribs and to concurrently tear the base of the rib away from the bottom of the container. These and other objects and advantages of the present invention will be more readily apparent from the detailed description thereof which follows.

Figure 5:
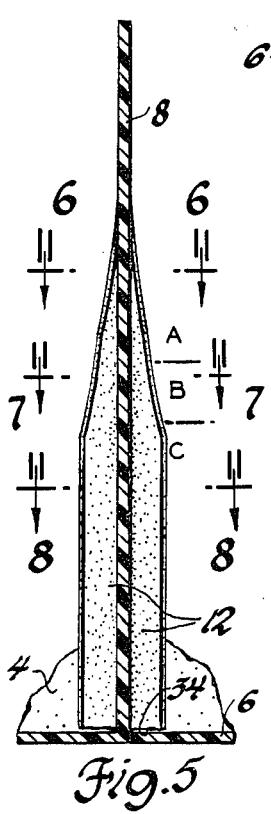
FIG. 5 is a view of reshaped ribs taken in the direction 5—5 of FIG. 4.
Figure 6:
Figure 7:
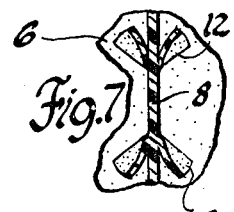
Figure 8:
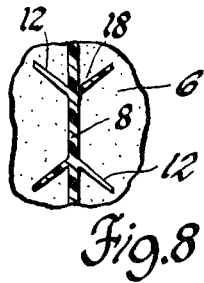
Figure 9:
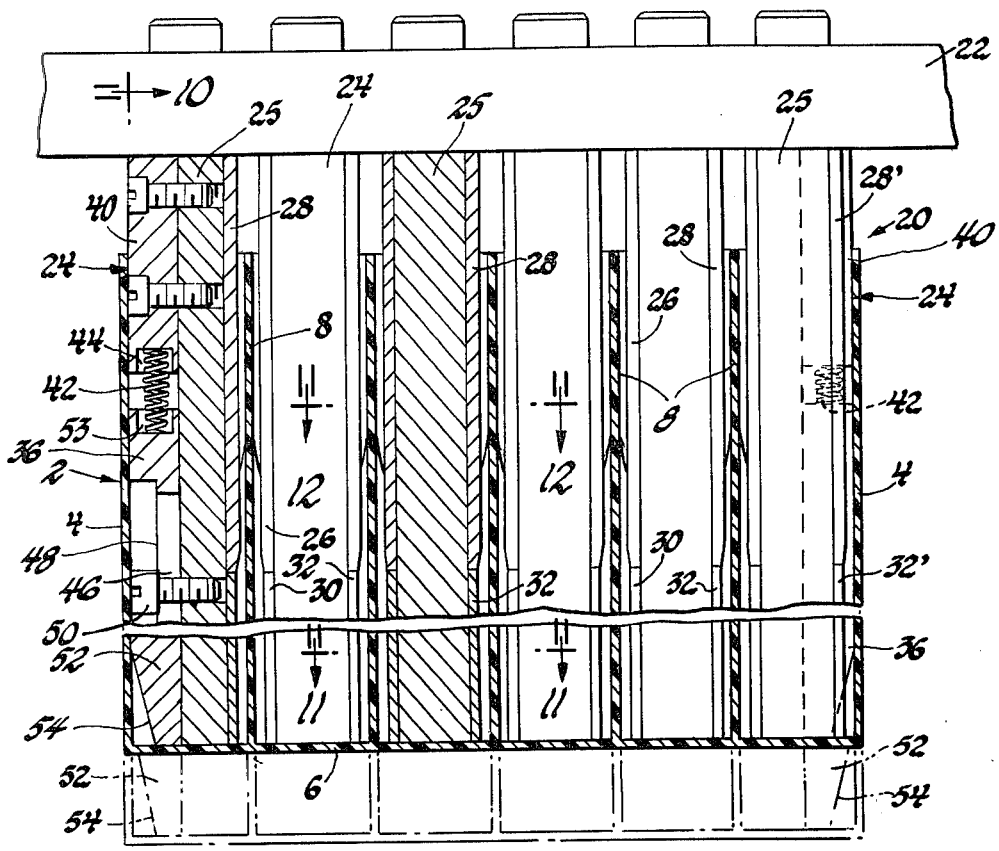
Figure 10:
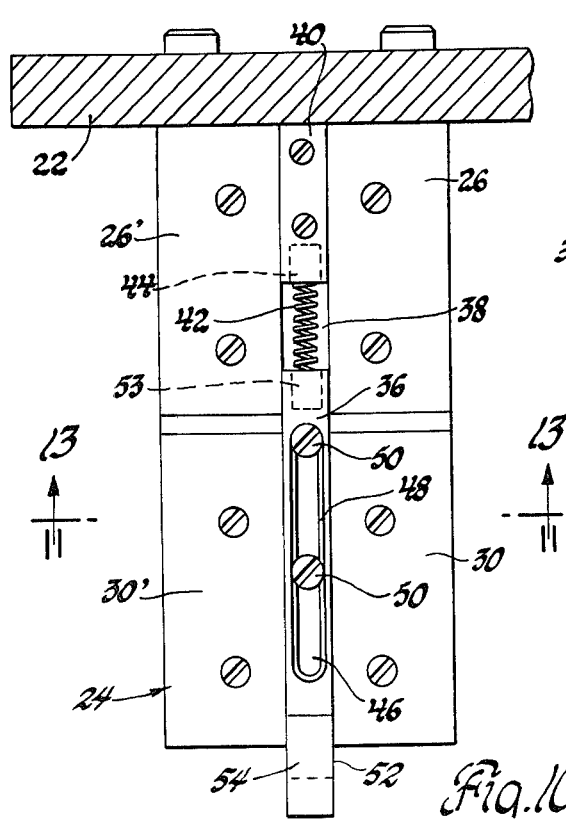
Figure 11:
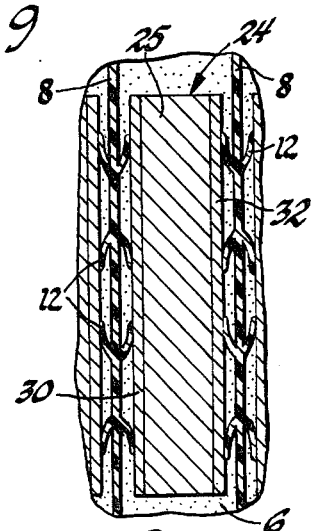
Figure 12:
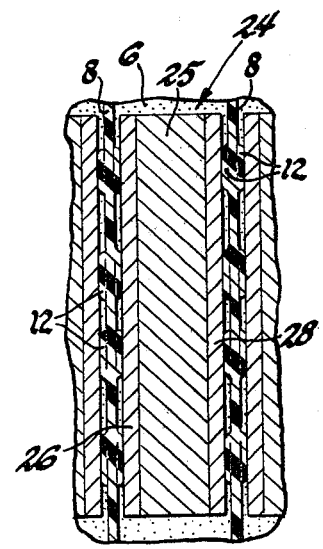
Figure 13:
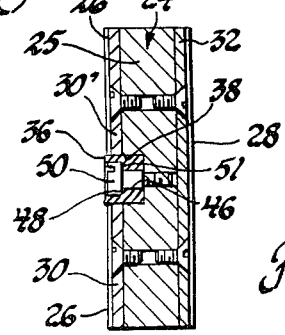

FIGS. 6, 7, and 8 are transverse horizontal sectional views taken in the directions 6—6, 7—7, and 8—8 of FIG. 5;

FIG. 9 is a sectioned side elevational view of a battery container having a rib deforming and tearing tool inserted therein;

FIG. 10 is a side elevational view of a rib reshaping and tearing tool taken in the direction 10—10 of FIG. 9 (reduced scale);

FIGS. 11 and 12 are sectioned views taken in the directions 11—11 and 12—12 of FIG. 9; and FIG. 13 is a sectioned view in the direction 13—13 of FIG. 10 (reduced scale).

BRIEF DESCRIPTION OF THE INVENTION

The present invention contemplates a battery container having resilent battery-innard-retaining ribs integrally molded to, and angling from, the container walls defining individual cell compartment(s), which ribs each have: (1) a lead-in portion which projects from its associated wall at a first angle; (2) a retaining portion projecting from its associated wall at a second angle which is greater than the first angle; and (3) a transition section intermediate the lead-in and retaining portions which projects from its associated wall at various angles intermediate the first and second angles and defines a ramp which faciliates insertion of the battery innards and deflection of the retaining portion without undue resistance or deleteriously affecting the innards during insertion. The invention further contemplates a process for reshaping as-molded resilient ribs on the walls of a battery container by plastically deforming the portion of the rib (usually the upper portion) nearest or proximate the opening in the container through which the innards are inserted into the container. More specifically, the portion of the rib closest to the insertion opening is folded against its associated wall so as to plastically deform the root of the rib where it meets the wall and such that upon removal of the deforming tool the deformed portion springs only part way back to its as-molded angle. This shallowly angled portion serves as a lead-in for the innards during insertion. The remainder (i.e., at least about ½-preferably about ⅔) of the rib is not plastically deformed, and accordingly, remains at about the as-molded condition (anglewise with respect to the wall) and is the principal portion of the rib that retains the cell innards firmly in the compartment. Between the deformed lead-in portion and the undeformed retainer portion, lies a short segment of rib whose angle, with respect to the wall, lies between the lead-in portion's angle and the retaining portion's angle and increases with distance from the lead-in portion. This transition section between the lead-in and retaining rib angles inherently results from the plastic deformation of only part of the rib and not the other.

In a preferred embodiment of the process, and where the battery innards are particularly thick, the base of the rib is torn from the bottom of the container concurrently with the plastic deformation of the lead-in portion. This provides maximum flexibility of the rib through its entire length, top-to-bottom, which would not otherwise occur if the base of the rib remained anchored to the bottom of the case as would normally occur during molding. Preferred means for deforming the upper lead-in portion of the rib and severing the base of the rib from the bottom of the container comprises a combination tool having a wide upper portion which engages only the approximate upper one-third of the rib and a narrower lower portion which extends to the bottom of the container. The width of the upper portion is almost equal to the size of the compartment opening (i.e., less only by about twice the thickness of the ribs at their roots). The width of the narrower lower portion approximates the thickness of the widest cell element useful with the particular container and sufficient only to elastically deform the retaining portion of the rib and to tear it away from the bottom of the container. Upon removal of the tool, the plastically deformed lead-in portion only partially returns to its as-molded angle while the elastically deformed retaining portion of the rib returns substantially to its original as-molded angle. Hence, the plastically deformed lead-in portion assumes a much smaller angle with respect to the wall than the elastically deformed retaining portion.

The invention then reshapes the as-molded ribs to deform the leading portion thereof which first engages the cell's innards during "case-out" so as to provide an inclining ramp-like structure which serves to glide the cell innards into the container in a manner which causes the resilient ribs to fold back towards their associated wall without undue insertion pressure and without cutting into or otherwise deleteriously affecting the cell innards.

DETAILED DESCRIPTION OF A SPECIFIC EMBODIMENT OF THE INVENTION

Figure 1:
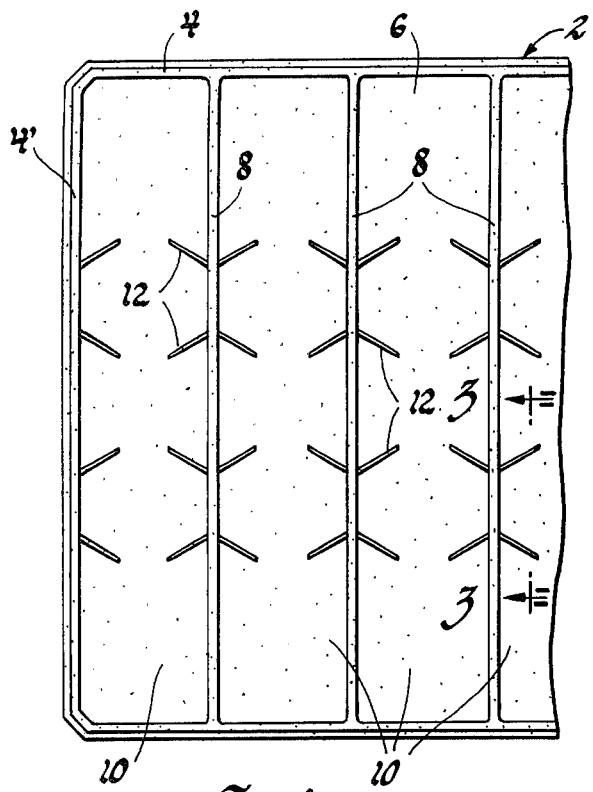
FIG. 1 is a partial plan view of an as-molded battery container looking down through the open top thereof.
Figure 2:
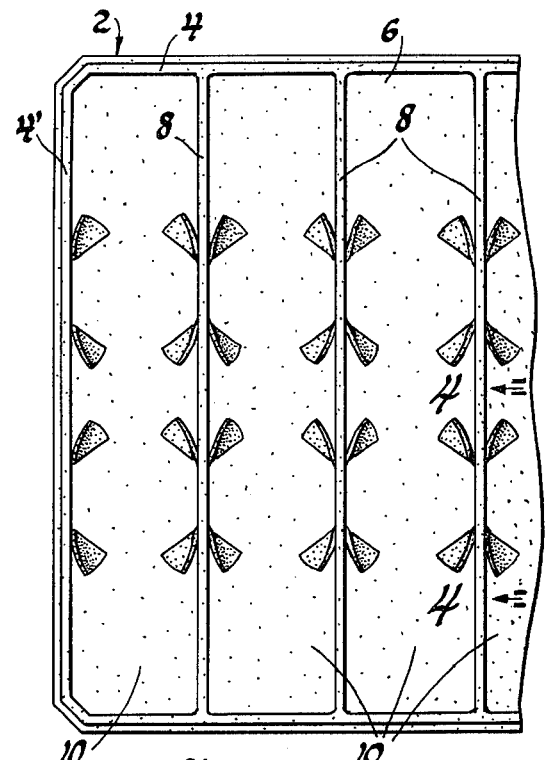
FIG. 2 is a partial plan view of the same container as illustrated in FIG. 1, but after the ribs have been reshaped in accordance with the present invention.
Figure 3:
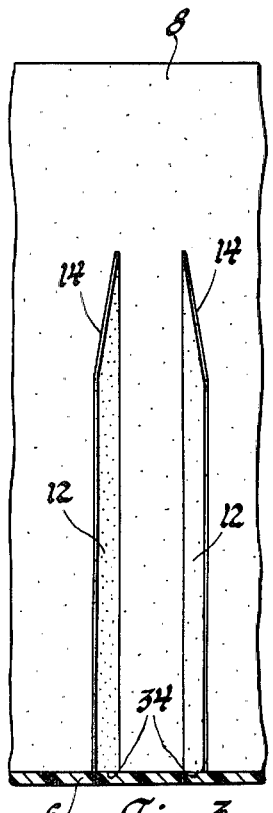
FIG. 3 is a view of as-molded ribs taken in direction 3—3 of FIG. 1.

FIGS. 1 and 2 illustrate a portion of a multicell battery container 2 looking down into the container through the open top thereof. The container 2 comprises an outside peripheral wall 4–4', a bottom 6 and a plurality of partitions 8 dividing the container 2 into a plurality of cell compartments 10. The battery's electrochemical elements (not shown) are housed in the compartments 10 and comprise essentially a plurality of positive plates electrically connected together, a plurality of negative plates electrically connected together and a plurality of microporous separators interjacent the several plates. The elements will vary in thickness depending on the number of positive and negative plates used. To accommodate elements of varying thicknesses within a single container, the end walls 4' and intercell partitions 8 are provided with resilient ribs 12 which extend into the cell compartments 10 at an acute angle (i.e., about 60°) from the compartment walls 4' and 8 to which they are attached. These ribs 12 will normally taper somewhat from their roots (i.e., adjacent the wall) to their distal tips (i.e., engaging the cell elements) as well as from their base (i.e., near the bottom of the container) to their top (i.e, proximate the container opening). FIGS. 1 and 3 depict the ribs 12 in their as-molded condition whereas FIGS. 2 and 4–8 depict the ribs 12 after they have been reshaped in accordance with the present invention. As best shown in FIG. 3, the tops 14 of the ribs 12 angle sharply downwardly and serve to help guide the cell elements toward the center of the cell compartment 10.

Figure 4:
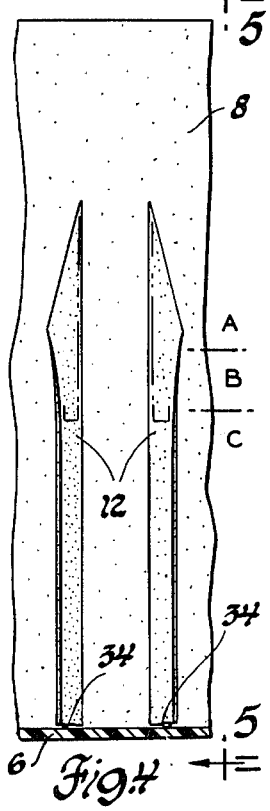
FIG. 4 is a view of reshaped ribs taken in the direction 4—4 of FIG. 2.

FIGS. 4 and 5 designate essentially three distinct zones (i.e., approximately A, B, & C) of the reshaped rib 12. The upper or lead-in portion (i.e., Zone A) of the rib 12 includes that portion of the rib 12 proximate the open top of the container which is plastically deformed at its root by folding the rib back flat against its associated partition 8. The thusly deformed portion of the rib does not spring all the way back to its as-molded angle upon removal of the deforming tool, but rather, only to a much lesser angle 16 (e.g., about 10°–20°) as best shown in FIG. 6. The lower portion (i.e., Zone C) of the rib comprises the major portion of the rib and remains undeformed and virtually at its as-molded angle 18 (FIG. 8) which functions primarily as the element-retaining portion of the rib 12. Between the upper lead-in portion A and the lower element-retention portion C lies a short transition section (i.e., Zone B). In this intermediate transition section B, the angle that the rib 12 assumes with respect to the partition 8 changes quite rapidly in the direction along the length (i.e., height) of the rib and forms an inclined ramp. Upon insertion into the container, the battery innards engage the lead-in portion A and transition section B and more gently initiate the folding back of the retaining portion C. The net affect of thusly reshaping the ribs then is to reduce the insertion force required and to substantially prevent damage to the cell innards during insertion.

FIGS. 9–13 depict a means for reshaping the ribs 12. More specifically, FIG. 9 is a partially sectioned view of a battery container positioned on a reshaping tool 20. The reshaping tool 20 includes a mounting plate 22 having a plurality of mandrels 24 bolted thereto. The mandrel 24 has a core portion 25 and a plurality of sizing plates 26, 28, 30 and 32 bolted (i.e., 34) thereto to provide the requisite size for reshaping the ribs in any given container size. The lower plates 30–32 are required only when it is desired to rip the bottoms 34 of the rib 12 away from the bottom of the case 6 as illustrated in FIG. 4. Otherwise, they may be removed so that while the core 25 may extend to the bottom of the container 2 only the upper plates 26–28 engage and deform the upper portion A of the ribs 12. Sizing of the plates 26–28 and 30–32 is such that the upper (i.e., lead-in) portion of the ribs 12 are folded back flat against their associated wall 8 (i.e., see FIG. 12) to plastically deform the roots of the ribs. When used, the lower plates 30–32 are so sized as to fold back the lower (i.e., retaining) portions of the ribs 12 only enough to tear the bases 34 thereof away from the bottom 6 of the container 2 but not enough to plastically deform the root of the ribs 12 (see FIG. 11). Typically, the overall width of the lower portion of the tool 20 will be about the thickness of the widest cell element destined for use in the particular container being worked on.

Another feature of the reshaping tool 20 includes ejector bars 36 included in the end mandrels 24. The center mandrels have one-piece plates 26–28 and 30–32 while the outside plates of the end mandrels 24 have split plates 26–26', 28–28', 30–30' and 32–32'. As best shown in FIG. 10, the split plates are spaced apart at the center of the mandrel so as to define a slot 38 therebetween. An anchoring bar 40 is bolted to the core 25 in the slot 38 near the mounting plate 22. The anchoring bar 40 includes a cavity 44 in the lower end thereof for receiving a spring 42. The ejector bar 36 (see FIGS. 10 and 13) includes a slot 46 having a shoulder 48. Anchoring screws 50 fit through the slot 46 and into the core 25 such that the undersides of their heads 51 engage the shoulder 48 and hold the ejector 36 slideably against the core 25. A cavity 53 at the upper end of the ejector bar 36 receives the other end of the spring 46. During positioning (e.g., lifted by an elevator) of the container 2 on the tool 20, the ejector 36 is pushed upwardly against the compression spring 42. When the container positioning force is removed, the spring 42 drives the ejectors 36 forward to help strip the container 2 from the tool 20, as best illustrated in phantom in FIG. 9. The lower end of the ejector 36 includes a tip 52 which has an angling exterior surface 54. The surface 54 serves to guide the container 2 into proper position on the tool 20.

While this invention has been disclosed primarily in terms of a single embodiment thereof, it is not intended to be limited thereto, but rather only to the extent set forth in the claims which follow.

The embodiments of the invention in which an exclusive property or privilege is claimed are defined as follows:

1. A process for making a battery container comprising the steps of:
   molding a container comprising (a) opposing walls defining at least one cell compartment including an opening for admitting the battery's electrochemical innards into the compartment and (b) ribs integrally molded with said walls, said ribs each having a root at said wall and a flexible part projecting from said root into said compartment at a first acute angle, said flexible part having a lead-in portion proximate said opening and a retaining portion remote from said opening for holding the battery's innards substantially centrally of said cell compartment; and
   deflecting said lead-in portion toward its associated wall sufficiently to plastically deform its root such that upon removal of the deflecting means and prior to inserting said innards into said compartment said lead-in portion assumes a second acute angle with respect to said wall which is less than said first acute angle
   whereby a ramp-like transition section of rib is provided intermediate said portions and projects from said wall at an angle intermediate said second angle of said lead-in portion and said first angle of said retaining portion, which section facilitates deflection of said retaining portion by said innards during insertion into said compartment without deleteriously affecting said innards.

2. A process for making a battery container comprising the steps of:
   molding a container comprising (a) a bottom wall, (b) opposing side walls defining at least one cell compartment including an opening for admitting the battery's electrochemical innards into the compartment, and (c) ribs integrally molded with said side walls, said ribs each having a root at said side wall and a flexible part projecting from said root into said compartment at a first acute angle, said flexible part having a lead-in portion proximate said opening, a retaining portion remote from said opening for holding the battery's innards substantially centrally of said cell compartment and a base integral with said bottom wall;
   deflecting said lead-in portion toward its associated wall sufficiently to plastically deform its root such that upon removal of the deflecting means and prior to inserting said innards into said compartment said lead-in portion assumes a second acute angle with respect to said wall which is less than said first acute angle; and
   deflecting said innard-retaining portion sufficient to tear the base thereof free from said bottom wall without plastically deforming said retainer portion and such that upon removal of the deflecting means and prior to inserting said innards into said compartment said innard-retaining portion returns substantially to said first acute angle
   whereby a ramp-like transition section of rib is provided intermediate said portions and projects from said wall at an angle intermediate said second angle of said lead-in portion and said first angle of said retaining portion, which section facilitates deflection of said retaining portion by said innards during insertion into said compartment without deleteriously affecting said innards.

3. A process for making a battery comprising the steps of:
   molding a container comprising (a) opposing walls defining at least one cell compartment including an opening for admitting the battery's electrochemical innards into the compartment and (b) ribs integrally molded with said walls, said ribs each having a root at said wall and a flexible part projecting from said root into said compartment at a first acute angle, said flexible part having a lead-in portion proximate said opening and a retaining portion remote from said opening for holding the battery's innards substantially centrally of said cell compartment;
   inserting a tool into said compartment through said opening to plastically deform only said lead-in portion at its root such that upon removal of said tool said lead-in portion assumes a second acute angle with respect to said wall which is less than said first acute angle and a ramp-like transition section of rib is formed intermediate said portions; removing said tool; and thereafter inserting said innards into said compartment through said opening and against said transition section to deflect said retaining portion without damage to said innards.

4. A process for making a battery comprising the steps of:

molding a container comprising (a) a bottom wall, (b) opposing side walls defining at least one cell compartment including an opening for admitting the battery's electrochemical innards into the compartment, and (c) ribs integrally molded with said side walls, said ribs each having a root at said side wall, and a flexible part projecting from said root into said compartment at a first acute, said flexible part having a lead-in portion proximate said opening, a retaining portion remote from said opening for holding the battery's innards substantially centrally of said cell compartment, and a base integral with said bottom wall;

inserting a tool into said compartment through said opening to plastically deform said lead-in portion at its root and to elastically deform said innard-retaining portion sufficient to tear the base thereof free from said bottom wall, said plastic deforming of said lead-in portion being such that upon removal of said tool said lead-in portion assumes a second acute angle with respect to said wall which is less than said first acute angle and a ramp-like transition section of rib is formed intermediate said portions;

removing said tool; and thereafter inserting said innards into said compartment through said opening and against said transition section to deflect said retaining portion without damage to said innards.

* * * * *